US006830795B1

(12) United States Patent
Downs

(10) Patent No.: US 6,830,795 B1
(45) Date of Patent: Dec. 14, 2004

(54) STRIPE COATED LINERLESS LABELS

(75) Inventor: George Downs, Centerville, OH (US)

(73) Assignee: The Standard Register Company, Dayton, OH (US)

( * ) Notice: Subject to any disclaimer, the term of this patent is extended or adjusted under 35 U.S.C. 154(b) by 474 days.

(21) Appl. No.: 09/649,109

(22) Filed: Aug. 28, 2000

(51) Int. Cl.[7] .................................................. B32B 7/12

(52) U.S. Cl. ........................ 428/40.1; 283/81; 428/41.8; 428/42.2; 428/42.3; 428/43; 428/192; 428/194; 428/201; 428/906; 462/72; 462/900; 462/901

(58) Field of Search .............................. 428/40.1, 41.8, 428/42.1, 42.2, 42.3, 43, 192, 194, 201, 906, 343, 352, 354; 462/72, 900, 901; 283/81, 62

(56) References Cited

U.S. PATENT DOCUMENTS

| | | | | |
|---|---|---|---|---|
| 4,036,511 A | | 7/1977 | Maalouf | |
| 4,235,459 A | | 11/1980 | Callahan | |
| 4,715,622 A | | 12/1987 | Mikhail | |
| 4,978,145 A | | 12/1990 | Mikhail | |
| 5,031,939 A | | 7/1991 | Webendorfer et al. | |
| 5,154,668 A | | 10/1992 | Schubert | |
| 5,154,962 A | * | 10/1992 | Mertens | 428/40 |
| 5,168,002 A | | 12/1992 | Maietti | |
| 5,183,696 A | | 2/1993 | Sanderson | |
| 5,197,922 A | | 3/1993 | Schubert | |
| 5,224,897 A | | 7/1993 | Linden et al. | |
| 5,248,279 A | | 9/1993 | Linden et al. | |
| 5,292,713 A | | 3/1994 | Stenzel et al. | |
| 5,294,041 A | | 3/1994 | Whiteside | |
| 5,324,078 A | | 6/1994 | Bane | |
| 5,334,431 A | | 8/1994 | Longtin | |
| 5,354,588 A | | 10/1994 | Mitchell et al. | |
| 5,376,048 A | | 12/1994 | Whiteside | |
| 5,393,265 A | | 2/1995 | Linden et al. | |
| 5,439,721 A | | 8/1995 | Pedroli | |
| 5,569,515 A | | 10/1996 | Rice, II et al. | |
| 5,578,352 A | * | 11/1996 | Smith | 428/40.1 |
| 5,587,214 A | | 12/1996 | Mitchell, Jr. | |
| 5,614,278 A | | 3/1997 | Chamberlain et al. | |
| 5,707,713 A | | 1/1998 | Langan et al. | |
| 5,738,383 A | | 4/1998 | Main et al. | |
| 5,750,192 A | | 5/1998 | Smith | |
| 5,782,496 A | | 7/1998 | Casper et al. | |
| 5,922,642 A | | 7/1999 | Tamura et al. | |
| 5,970,640 A | | 10/1999 | Farrow | |
| 5,976,014 A | | 11/1999 | Petrick et al. | |
| 5,984,363 A | | 11/1999 | Dotson et al. | |
| 5,985,441 A | | 11/1999 | Szczepaniec et al. | |
| 6,037,042 A | | 3/2000 | Kato et al. | |
| 6,123,253 A | | 9/2000 | Mehta et al. | |
| 6,158,651 A | | 12/2000 | Mehta et al. | |
| 6,254,955 B1 | * | 7/2001 | Kuo et al. | 428/42.2 |
| 6,322,106 B1 | | 11/2001 | Mehta et al. | |

FOREIGN PATENT DOCUMENTS

| | | | |
|---|---|---|---|
| EP | 819298 | * | 1/1998 |

* cited by examiner

*Primary Examiner*—Nasser Ahmad
(74) *Attorney, Agent, or Firm*—Dinsmore & Shohl LLP

(57) ABSTRACT

A linerless label is provided, that can be easily imaged, printed, or hand written upon by the end user. The label consists of a single ply, dispensed usually in a roll form, or alternatively, in a stacked form. A label roll is formed from a web of ply. The face of the web is stripe coated with an adhesive repellant release coat. The back of the web of ply is stripe coated with adhesive. Upon winding the web of ply into a roll, the adhesive on the back of the web of ply overlies the adhesive repellant stripes on the face of the web therebelow. The regions of the face of the web of ply not striped with adhesive repellant form areas for user printing and handwriting. Further, any portion of the face of the web of ply may be press printed prior to the application of the adhesive repellant stripes. Likewise, a label stack includes a plurality of label sheets superposed one on top the other. The face of each label sheet is stripe coated with an adhesive repellant release coat, and the back of each label sheet is stripe coated with adhesive. The stack is formed such that the adhesive on the back of each label sheet overlies the release coat on the label therebelow.

20 Claims, 5 Drawing Sheets

STRIPE COATED LINERLESS LABELS

BACKGROUND OF THE INVENTION

The present invention relates in general to a label and in particular to a stripe coated, linerless label.

Labels have become a popular solution to a number of applications ranging from addressing envelopes, parcels, and packaged goods to product identification and pricing. A typical label consists of a ply of material which may include information or other indicia printed on its face, and an adhesive coat applied to its back. The label further includes a release coated liner ply. The liner ply is typically treated with a substance such as silicone, and placed on the back of the label to cover and protect the adhesive. A user peels the protective, release coated liner ply from the label, adheres the label to the work surface, and discards the liner ply. However, the present inventors have recognized that under certain circumstances, there are disadvantages associated with this label arrangement, such as environmental costs including the necessity of disposing of the liner ply, increased cost of manufacturing the liner ply, and the time required for a user to peel the liner ply from the label, and dispose of the waste.

Manufacturers have attempted to solve some of the above problems by providing a label that does not require a separable liner. One known label construction forms a linerless label by stacking two labels back to back. The backs of each label contain areas of adhesive and areas of adhesive repellant. The positioning is such that the adhesive on the back of the first label aligns with the adhesive repellant area on the back of the second label, and the adhesive on the back of the second label aligns with the adhesive repellant on the back of the first label. While this label construction does provide a linerless label, the alignment of the labels back to back is ineffective where a user wishes to use only one label at a time. Additionally, it may be difficult for a manufacturer to align the areas of adhesive and adhesive repellant on the same side of the label ply.

A second known label coats the entire face of a label with an adhesive repellant liner coat, and the back of the entire label with adhesive. The labels are assembled such that the face of a first label acts as the liner for a second label, which is stacked thereon. While this label construction does provide a label that can be dispensed one at a time, this label construction is often expensive and difficult to manufacture, and because of the adhesive on the back of the label, perforating machines may jam or get clogged up. Also, the adhesive repellant may yield a very low surface energy making it difficult for users to handwrite or print upon the label.

Yet another known label coats the entire back of a label with adhesive. The face of the label is coated with successive layers of an ink based adhesive repellant. A final in transparent layer of ink adhesive repellant overlies the entire label face. The labels are assembled such that the face of a first label acts as the liner for a second label. While this arrangement avoids a liner, it requires several passes to ink the label, and still yields a label face with low surface energy.

SUMMARY OF THE INVENTION

The present invention overcomes the disadvantages of previously known labels by providing a linerless label that can be easily imaged, printed, or hand written upon by the end user and provides a convenient, and flexible solution to a broad range of label applications. The present invention includes a label roll formed from a web of ply. The face of the web is stripe coated with an adhesive repellant release coat. The back of the web of ply is stripe coated with adhesive. Upon winding the web of ply into a roll, the adhesive on the back of the web of ply overlies the adhesive repellant stripes on the face of the web therebelow. The regions of the face of the web of ply not striped with adhesive repellant form areas for user printing and handwriting. Further, any portion of the face of the web of ply may be press printed prior to the application of the adhesive repellant stripes. Likewise, a label stack includes a plurality of label sheets superposed one on top the other. The face of each label sheet is stripe coated with an adhesive repellant release coat, and the back of each label sheet is stripe coated with adhesive. The stack is formed such that the adhesive on the back of each label sheet overlies the release coat on the label therebelow.

In a first embodiment of the present invention, a label roll is formed from a web of ply having a plurality of transverse lines of perforations dividing the web of ply into a plurality of separable labels. Each label has a label face, and a label back, and first and second web edges extending in the direction of the web. A pattern release coat is applied to each of the label faces, and a pattern adhesive is applied to each of the label backs. The web of ply is formed into a roll such that the pattern adhesive overlies the pattern release coat. The label roll may optionally include a release liner covering the adhesive portion of the first, and innermost label in the roll. Preferably, each label face includes at least two release coat free areas, and at least two stripes of release coat in the direction of the web of ply. More preferably, each label face includes a first ha stripe of release coat adjacent to the first web edge, a second stripe of release coat adjacent to the second web edge, and at least one stripe of release coat applied between the first and second stripes of release coat. Printed indicia may be applied to rig each label face, and may be applied in a release coat free area, or the printed indicia may be overlain by a stripe of release coat. Further, pattern adhesive may overlie the pattern release coat within the release coat periphery, thus allowing for a tolerance for manufacturing.

In a second embodiment of the present invention, a label stack is formed from a a plurality of plies, each ply having a face, a back, and first and second longitudinal edges. A pattern release coat is applied to the face of each ply, and a pattern adhesive coat applied to the back each ply. The plurality of plies are stacked such that the pattern release coat on each ply is in register with the pattern adhesive on the ply immediately above. The plies forming the label stack may optionally be superposed on a liner ply to protect the adhesive on the bottom ply. The face of each ply preferably includes at least two release coat free areas, and at least two stripes of release coat. More preferably, the face of each label includes a first stripe of release coat adjacent the first longitudinal edge, a second stripe of release coat adjacent the second longitudinal edge, and at least one stripe of release coat-applied between the first and second stripes of release coat. To assist the user in removing a single label from the stack, the back of each ply includes a lift edge, and an adhesive free zone adjacent at least a portion of the lift edge. To assist the manufacturing process of the label stack, the pattern adhesive can be applied in stripes thinner than their corresponding release coat stripes so that the adhesive overlies the pattern release coat within the release coat periphery. This tolerance will allow for slightly imprecise stacking without sacrificing label performance. Further, printed indicia may be applied to the face of the ply.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals, and in which.

DETAILED DESCRIPTION OF THE PREFERRED EMBODIMENTS

Figure 1:
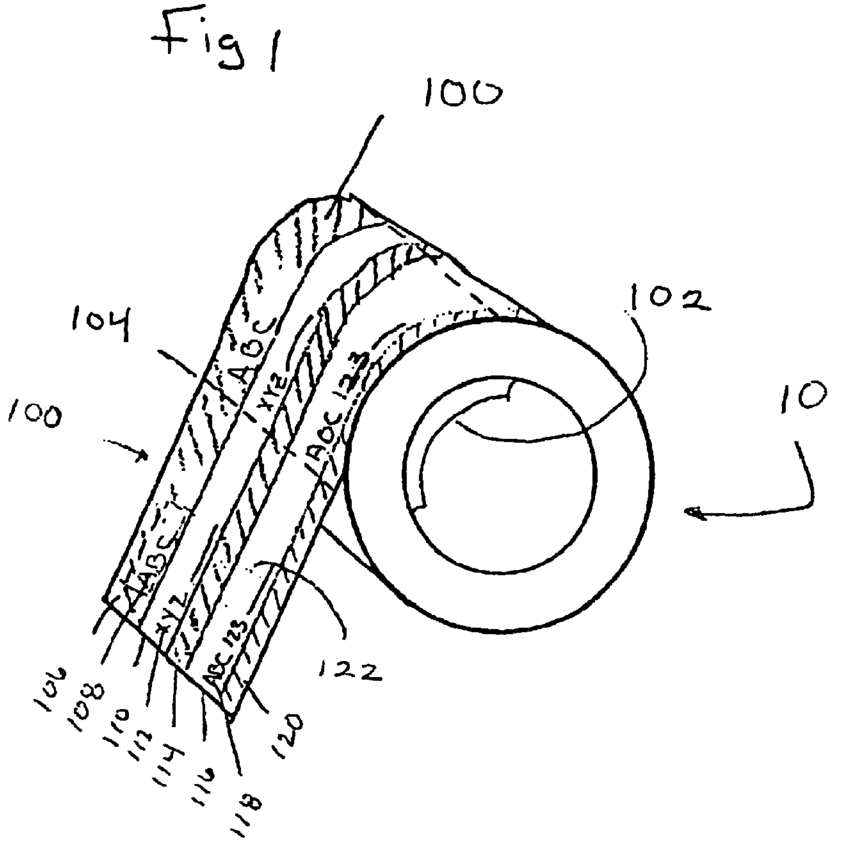
FIG. 1 is an illustration of an arrangement of linerless labels in a roll, where pattern strips of release coat appear as diagonal lines, and press printed indicia appears both under the release coat, and in areas outside the release coat.
Figure 2:
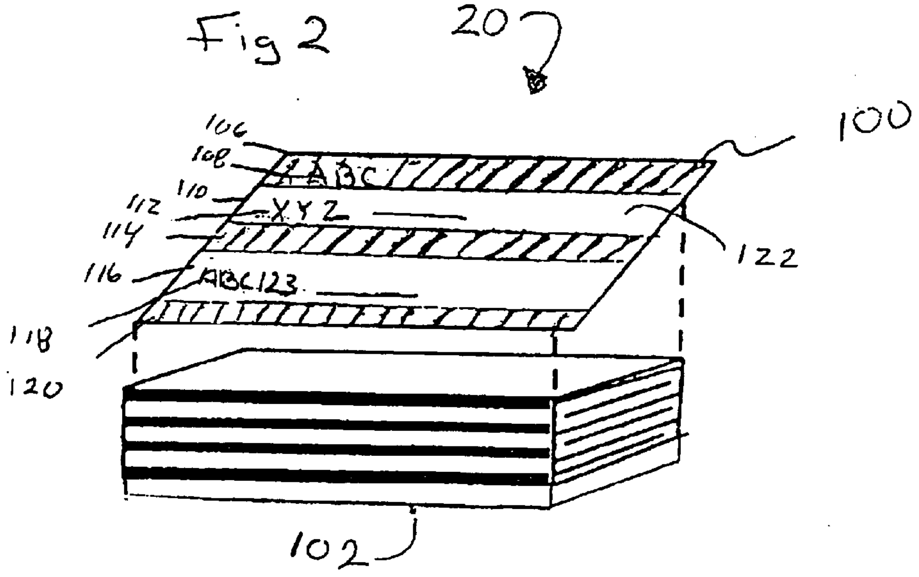
FIG. 2 is an illustration of an arrangement of linerless labels in a stacked form, where pattern strips of release coat appear as diagonal lines, and press printed indicia appears both under the release coat, and in areas outside the release coat.

FIG. 1 shows a label roll 10 according to one embodiment of the present invention. The label roll 10 consists generally of a plurality of labels 100 formed from a continuous web of material and rolled together, preferably with the label face 122 of each label 100 on the outside of the label roll 10. The label face 122 may optionally include press printed indicia 108, 112, 118 such as text, images, bar codes and the like. Users may also include unique information on the label face 122 by way of printing, handwriting and the like. Lines of perforation 104 facilitate separating the labels 100 from the label roll 10, as the individual labels 100 are dispensed. An optional release liner ply 102 may be included to cover and protect the adhesive backing of the innermost label 100 in the label roll 10. FIG. 2 shows a label stack 20 according to a second embodiment of the present invention. In this embodiment, the labels 100 are formed of discrete labels 100 superposed one on top the other to form the label stack 20. An optional release liner ply 102 may be included to cover and protect the adhesive backing of the label 100 on the bottom of the label stack 20.

Firstly, it should be understood that the label 100 can be made from any number of types of material, including for example paper, impregnated paper, coated paper, thermal sensitive paper, synthetic paper, bond paper, tag, latex, thermal sensitive film, polyolefin, polypropylene, polyester film, vinyl, or any combination of materials. The material selected will depend upon the requirements of the specific intended application. The label 100 can be either part of a continuous web as in the label roll 10 of FIG. 1, or alternatively, the label 100 may be a discrete label 100 used in the label stack 20 of FIG. 2.

Figure 3:
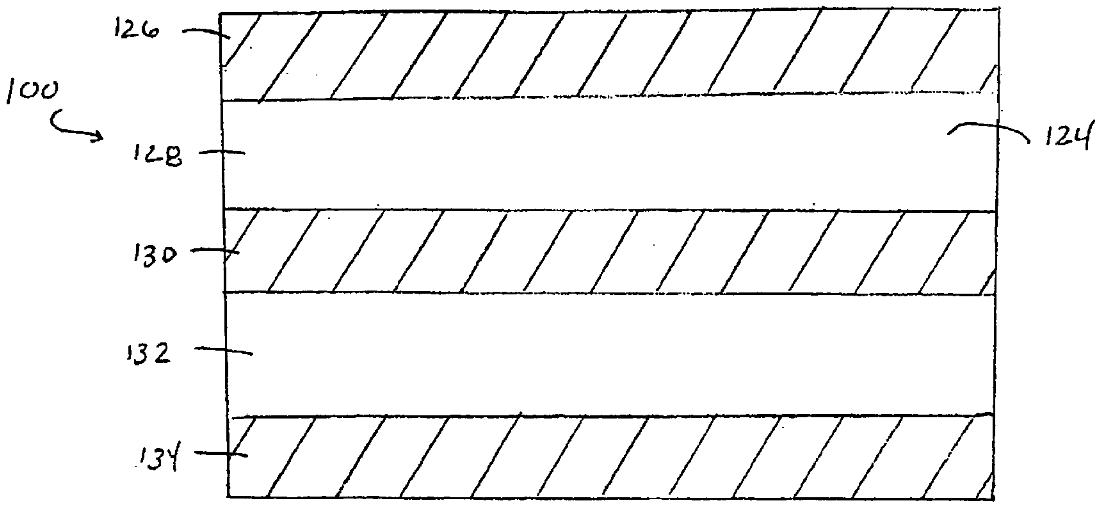
FIG. 3 is an illustration of the back surface of the label of FIGS. 1 and 2, where the patterns of striped adhesive are represented by diagonal lines.

Referring to FIG. 3, the label back 124 is pattern coated with stripes of adhesive 126, 130, 134. The adhesive selected is preferably a permanent adhesive, but may also be a pressure sensitive adhesive, cold temperature adhesive, removable or repositionable adhesive. The number of stripes, as well as the thickness of the stripes of adhesive 126, 130, 134 will vary depending upon the intended use of the label 100, and the surface to which the label 100 is intended to be adhered. In general, adhesive 126, 130, 134 should be sufficient to provide adequate holding against the work surface. Where the label 100 is to be formed from a continuous web of ply such as the label roll 10 in FIG. 1, the adhesive 126, 130, 134 preferably runs in the direction of the web of ply.

Referring back to FIGS. 1 and 2, the label face 122 is stripe coated with a release coat 106, 114, 120 (shown with diagonal lines). The release coat 106, 114, 120 may be a release liner coating material including preferably, a UV cured silicone release coat. However, any conventional release coat may be used including a water soluble silicone oil, a silicone oil emulsion, silicone rubber emulsion or wax type repellants. The release coat 106, 114, 120 imparts a low surface energy to the label face 122, and is positioned such that when a plurality of labels are formed in a label roll 10 as in FIG. 1, or alternatively a label stack as in FIG. 2, the adhesive 126, 130, 134 overlies the release coat 106, 114, 120 of a label 100 therebelow. Therefore, the release coat 106, 114, 120 is selected to include properties such that the adhesive 126, 130, 134 will release easily from, yet retain an affinity for the release coat 106, 114, 120.

Figure 4:
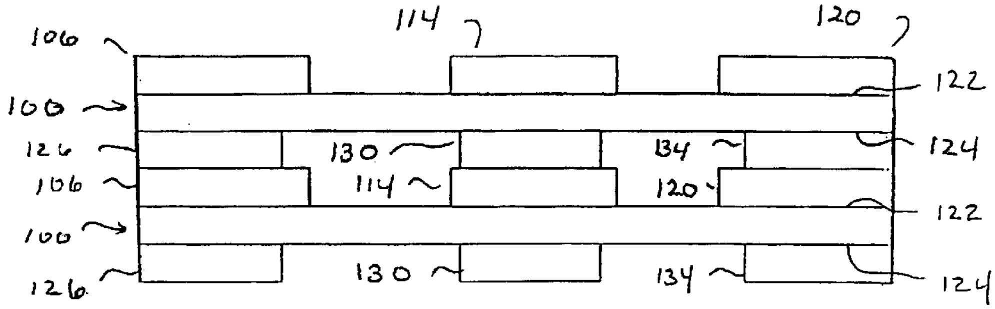
FIG. 4 is a sectional view of two labels stacked one on top of another, illustrating the relationship between pattern adhesive and pattern release coat.

Referring to FIG. 4, each label face 122 includes release coat 106, 114, 120, and each label back 124 includes adhesive 126, 130, 134. As the labels 100 are stacked or rolled, the adhesive 126, 130, 134 aligns with and overlies the release coat 106, 114, 120 respectively. Specifically, the adhesive 126 aligns with the release coat 106, adhesive 130 aligns with release coat 114, and adhesive 134 aligns with release coat 120. The width of adhesive 126, 130, 134 may optionally be sized slightly more narrow than their respective release coat counterparts 106, 114, 120 to provide a slight tolerance for stacking or rolling. Under this arrangement, the release coat 106, 114, 120 has a release coat periphery, and the adhesive 126, 130, 134 overlies the release coat 106, 114, 120 within the release coat periphery.

It should be understood that, while each label 100 incorporates a release coat 106, 114, 120 on the label face 122 in a predetermined pattern, and an adhesive 126, 130, 134 on the label back 124 in a predetermined pattern, the patterns need not mirror each other. For example, the adhesive 126, 130, 134 may be applied in discontinuous segments, discontinuous spots, dots or other arrangement while the pattern release coat 106, 114, 120 is applied as continuous stripes. Further, the adhesive 126, 130, 134 may be formed into stripes slightly thinner than their mating release coat 106, 114, 120 to allow slight tolerances for manufacturing. Any pattern combination of release coat 106, 114, 120 and adhesive 126, 130, 134 is within the spirit of the invention so long as the adhesive generally aligns with a release coated portion of the label face 122.

Referring to FIGS. 1 and 2, the release coat 106, 114, 120 imparts a low surface energy to the label face 122 making it difficult for users to write or print upon the label face 122 in the release coat 106, 114, 120 portions. Accordingly, the label face 122 includes stripes defining release coat free areas 110, 116. In the case of some low energy surface films, the release coat free areas 110, 116 and the stripes of release coat 106, 114, 120 may be formed by covering the entire label face 122 with a surface film, then applying an imprintable coating to define the release coat free areas 110, 116 for user handwriting and printing.

Depending upon the intended use of the label 100, it may be advantageous to include press printed indicia 108, 112, 116 on the label face 122. Press printed indicia 112 and 118 is included in release coat free areas 110 and 116 respectively. Press printed indicia 108 is included in release coat 106. Where the stripe of release coat 106 is transparent, it is preferable to apply press printed indicia 108 to the label face, then overlie the press printed indicia 108 with the release coat 106. For example, a web of ply may be imaged by passing the web through a printer capable of handling a linerless roll label product. A thermal printer may be used for such an application. The present invention may optionally be comprised of a direct thermal paper, and accordingly, be imaged through direct thermal printers where no ribbon is required. With direct thermal paper, the printing may be applied to the areas to be release coated since the paper is self contained.

Figure 5:
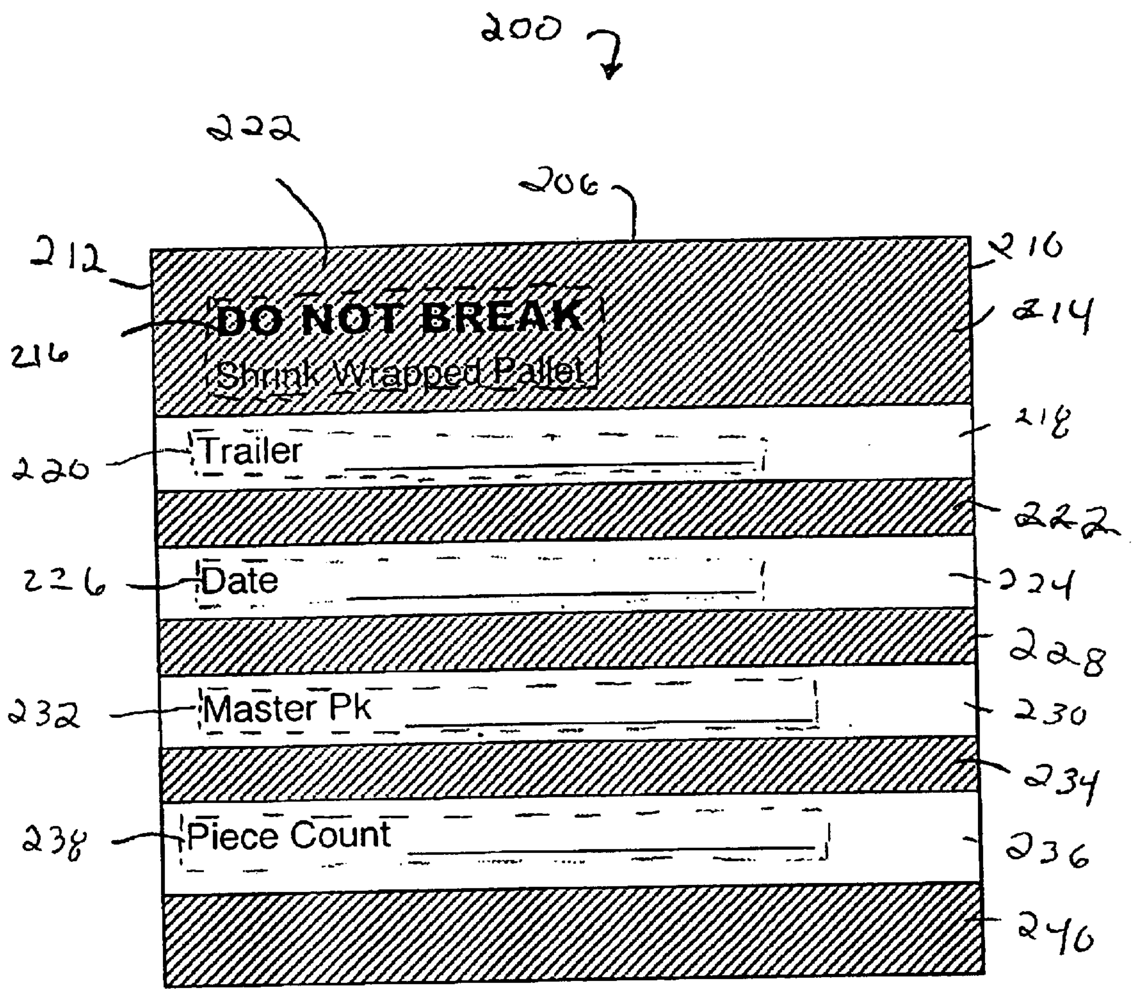
FIG. 5 is an illustration of the front face of a label demonstrating a typical application for the present invention, where pattern strips of release coat appear as diagonal lines, and press printed indicia appears both under the release coat, and in areas outside the release coat.

By way of example, FIG. 5 illustrates one possible implementation of the present invention, in the form of a warehouse label. This type of label can be utilized in an outbound process including pick and pack operations, rework operations, or alternatively, it can be used on the inbound receiving operation where pallets are shrink wrapped and put away for full pallet picks. The label 200 includes a plurality of stripes of release coat 214, 222, 228, 234, 240 (illustrated with diagonal lines). A first stripe of release coat 214 is adjacent the first web edge 206. First web edge 206 runs generally in the direction of the continuous web. Press printed indicia 216 is provided to convey certain information. Preferably, the first stripe of release coat 214 is a clear material, and the press printed indicia 216 is provided underneath the first stripe of release coat 214. Release coat free area 218 defines a release coat free zone and provides a surface that can accept user variable, as well as press print 220 imaging freely. Release coat stripes 222, 228, 234 and 240 are included because no user imaging is anticipated in those regions. Region 224 defines a release coat free area and includes press printed indicia 226, as well as provides an area for user information. Likewise, release coat free area 230 is a release coat free zone and provides press printed indicia 232. Release coat free area 236 is a release coat free zone and provides press printed indicia 238. The release coat free areas 218, 224, 230, and 236 are provided for a user who may wish to write upon the label 200 using a traditional pen, pencil, or other marking device. Further, imaging can be accomplished using laser printers, ink jet, thermal printers, impact printers, dot matrix, or any other imaging means available, provided their feeding mechanism is equipped to process linerless labels with exposed adhesive. It will be appreciated by those skilled in the art, that the particular width for each stripe of release coat 214, 222, 228, 234, 240 can vary-depending upon factors including user imaging requirements, and the like.

While FIG. 5 illustrates five distinct strips of release coat 214, 222, 228, 234, 240, any number of stripes of varying width can be used within the spirit of the invention. Further, while stripes are illustrated, it should be appreciated by those skilled in the art that the release coat 212, 222, 228, 234, 240 can be applied in any number of patterns where the labels are to be stacked. Finally, it should be appreciated that, while the release coat regions are shown generally as stripes, the pattern release coat 212, 222, 228, 234, 240 itself may be solid stripes, or in discontinuous segments or spots.

Figure 6:
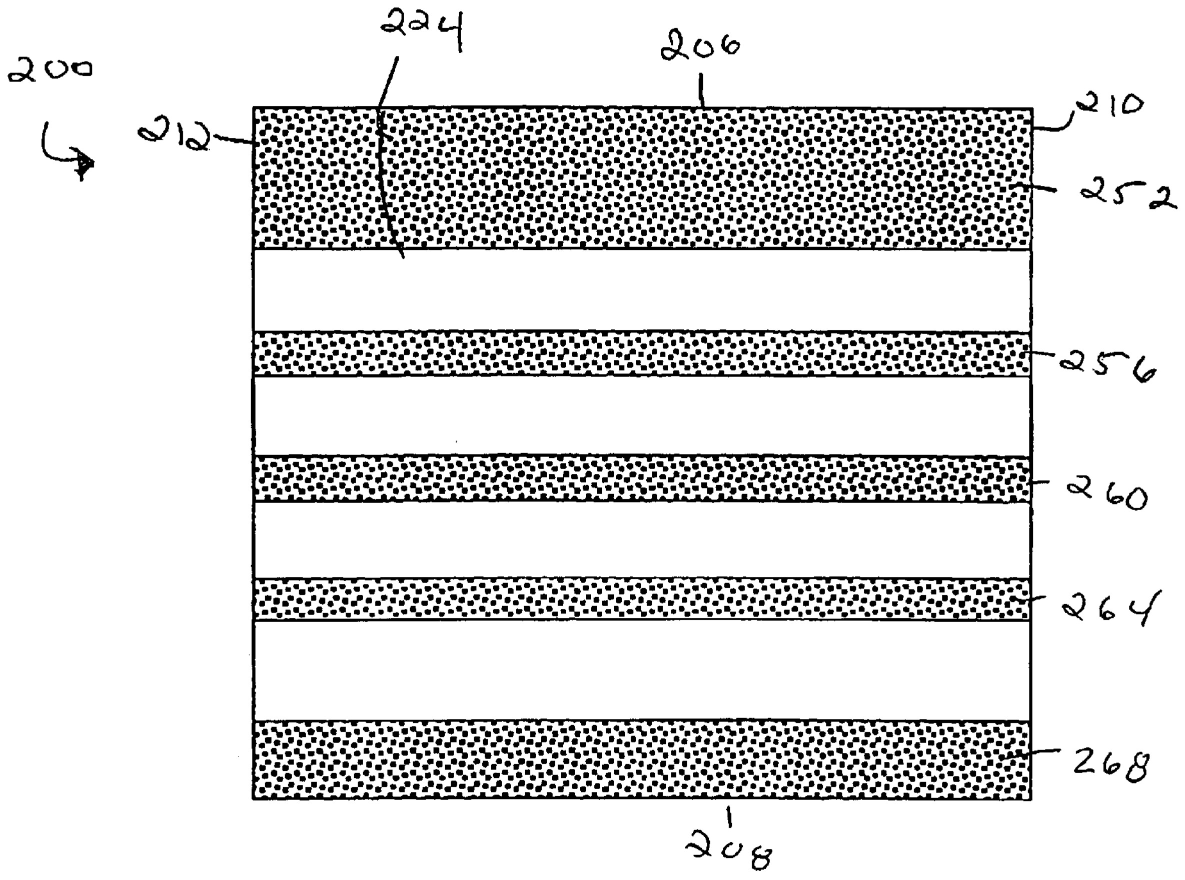
FIG. 6 is an illustration of the back face of the label of FIG. 5, where pattern adhesive strips appear as shaded regions; and, FIG. 7 is an illustration of the back face of the label of FIG. 5, where pattern adhesive strips appear as shaded regions, and further including a typical arrangement for a lift edge.

Referring to FIGS. 5 and 6, the label back 224 of the label 200 is shown, with stripes of adhesive generally indicated in shaded regions. The label back 224 includes a first stripe of adhesive 252 adjacent the first web edge 206. A second stripe of adhesive 268 is positioned adjacent to the second web edge 208. Further the label 15E back includes inner stripes of adhesive 256, 260 and 264 positioned between the first and second stripes of adhesive 252, 268 respectively. The positioning of the adhesive stripes 252, 256, 260, 264 and 268 are selected such that they will align substantially with the stripes of release coat 214, 222, 228, 234, 240 on the label face 222 of a label 200 stacked thereon. It should be appreciated by those skilled in the art that while the description generally refers to the positioning of adhesive 252, 256, 260, 264 and 268 as stripes, the actual adhesive may be applied in strips, discontinuous segments, or spots. Further, including a number of stripes of release coat 212, 222, 228, 234, 240 allows the label 200 to include adhesive on a higher percentage of the label back 224, thus improving the ability of the label 200 to adhere to a variety of work surfaces without buckling, peeling or other like effects. However, it should be appreciated by those skilled in the art that the adhesive 252, 256, 260, 264 and 268 may be applied in any pattern so long as it aligns with and overlies the release coat of a label therebelow.

Figure 7:
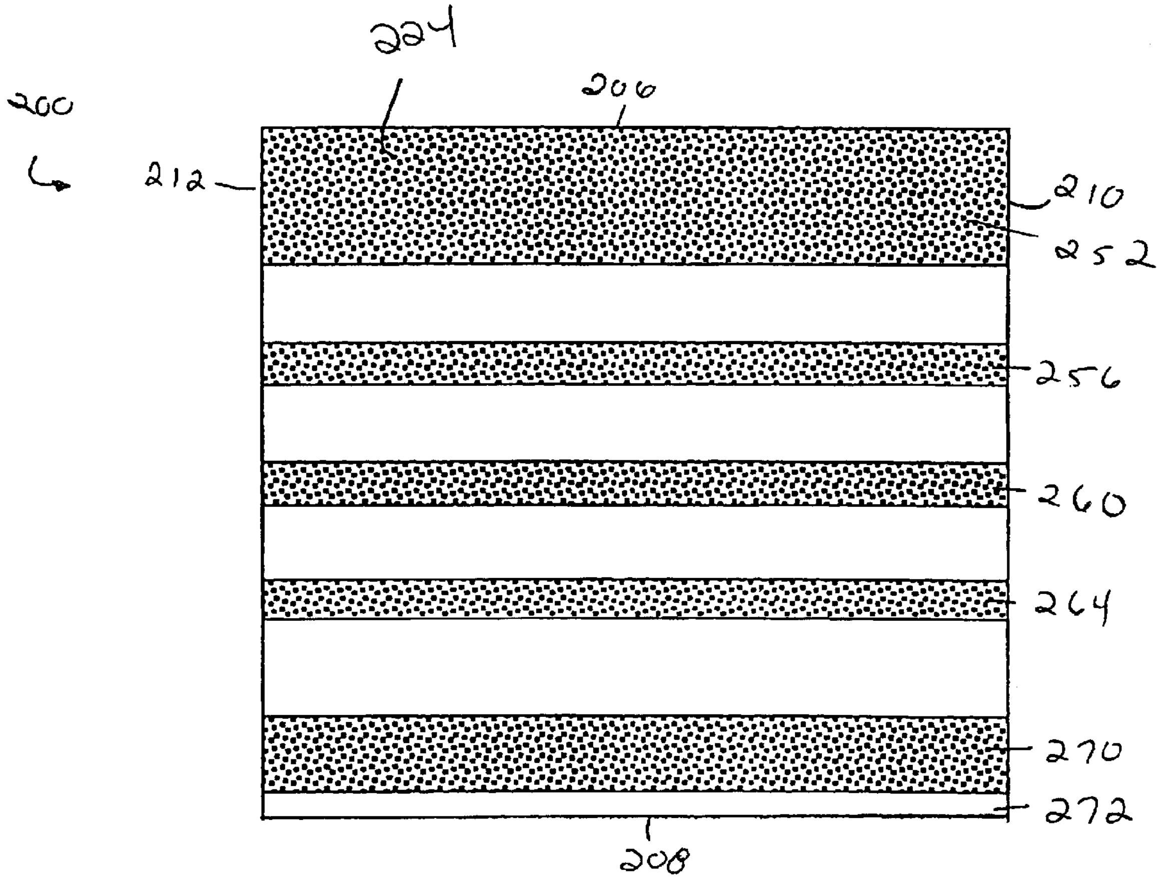

FIG. 7 shows a label back 224 similar to that in FIG. 6, however, the stripe of adhesive 268 adjacent to the second web edge 208 in FIG. 6 has been replaced with a stripe of adhesive 270, which is near, and generally parallel to the second web edge 208, and separated from the second web edge 208 by a thin, adhesive free strip that defines a lift area 272 to assist users in removing a label from the corresponding stack. The lift area 272 may be any dimension that allows a user to grasp the label 200. For example, a suitable lift area 272 may be a stripe approximately ⅛" wide. Further, it should be appreciated by those skilled in the art that the lift area 272 can be placed adjacent either the first web edge 206, the second web edge 208, the first transverse edge 212, or the second transverse edge 210.

In use, a user fills in the information requested by the label 200, then either dispenses the label 200 from a label roll, or pulls the top label 200 off a stack, depending upon how the labels 200 are assembled. The label 200 is adhered to the proper pallet, and the user moves on to the next label. While this example relates to one form of warehouse label, it should be clear to one skilled in the art that labels for virtually any application can benefit from this invention. By way of illustration, and not of limitation, the present invention may be modified and adapted for use as a warehouse shelf label, shipping label, ASN label, tool bin label, hospital bed label or move ticket label.

Having described the invention in detail and by reference to preferred embodiments thereof, it will be apparent that modifications and variations are possible without departing from the scope of the invention defined in the appended claims.

What is claimed is:

1. A label stack comprising:

a plurality of plies each having a face, a back, and first and second longitudinal edges;

a pattern release coat applied to said face of each ply, said pattern release coat defined by a first stripe of release coat adjacent to said first longitudinal edge, a second stripe of release coat adjacent to said second longitudinal edge and at least one inner stripe of release coat between and generally parallel to said first and second stripes of release coat and spaced therefrom by release coat free areas, wherein each face comprises preprinted indicia thereon and overlain by and visible through said pattern release coat; and, a pattern adhesive coat applied to each back, wherein said plurality of plies are stacked such that said pattern release coat on a first one of said plurality of plies aligns generally with said pattern adhesive on a second one of said plurality of plies immediately thereabove.

2. A label stack according to claim 1, wherein:

said plurality of plies further comprises a bottom one of said plurality of plies: and, a liner is applied to said back of said bottom one of said plurality of plies, said label stack formed by stacking said plurality of plies on top of said bottom one of said plurality of piles.

3. A label stack according to claim 1, wherein said pattern adhesive comprises a plurality of discontinuous segments of adhesive.

4. A label stack according to claim 1, wherein each back comprises a lift edge, and an adhesive free zone adjacent at least a portion of said lift edge, said adhesive free zone dimensioned so as to allow a user to grasp and remove a select one of said plurality of plies from the remainder ones of said plurality of plies in the stack.

5. A label stack according to claim 1, wherein each of said release coat free areas is capable of receiving handwritten or machine printed indicia.

6. A label stack according to claim 1, wherein first, second and at least one inner stripes of release coat each have a release coat periphery, and said pattern adhesive overlies said pattern release coat within said release coat peripheries.

7. A label stack comprising:

a plurality of labels having a face, a back, a first longitudinal edge, and a second longitudinal edge;

each face having a first stripe of release coat adjacent said first longitudinal edge, a second stripe of release coat adjacent said second longitudinal edge, and at least one inner stripe of release coat between and generally parallel to said first and second stripes of release coat, wherein a release coat free stripe separates each of said first, second, and at least one inner stripes of release coat;

each back having a first stripe of adhesive, a second stripe of adhesive, and at least one inner stripe of adhesive between said first and second stripes of adhesive;

preprinted indicia applied to each face in at least a portion of the areas overlain by and visible through said release coat;

a liner ply;

said plurality of labels stacked on said liner ply such that said first adhesive stripe aligns with said first stripe of release coat, said second stripe of adhesive aligns with said second stripe of release coat, and said at least one inner stripe of adhesive aligns with said at least one inner stripe of release coat of vertically adjacent ones of said plurality of labels.

8. A label stack according to claim 4, wherein said lift edge is defined along a select one of said first and second longitudinal edges.

9. A label stack according to claim 1, wherein a select one of said plies includes indicia thereon, said indicia comprising user variable indicia where said user variable indicia is hand written only and applied to said face in at least one release coat free area.

10. A label stack according to claim 1, wherein said preprinted indicia further comprises static press print indicia.

11. A label stack comprising:

a plurality of plies each having a face, a back, and first and second longitudinal edges;

a pattern release coat applied to said face of each ply, said pattern release coat defined by a first stripe of release coat adjacent to said first longitudinal edge, a second stripe of release coat adjacent to said second longitudinal edge and at least one inner stripe of release coat between said first and second stripes of release coat and spaced therefrom by release coat free areas wherein each face comprises preprinted indicia overlain by and visible through said pattern release coat; and, a pattern adhesive coat applied to each back, said pattern adhesive defined by a first stripe of adhesive adjacent and generally parallel to said first longitudinal edge, a first adhesive free area adjacent to said second longitudinal edge defining a lift edge dimensioned so as to allow a user to grasp and remove a select one of said plurality of plies from the remainder ones of said plurality of plies in the stack, a second stripe of adhesive generally parallel to said second longitudinal edge and spaced therefrom by said first adhesive free area, and at least one inner stripe of adhesive that corresponds generally to said at least one inner stripe of release coat and spaced therefrom by adhesive free area wherein said plurality of plies are stacked such that said pattern release coat on a first one of said plurality of plies aligns generally with said pattern adhesive on a second one of said plurality of plies immediately thereabove.

12. A label stack according to claim 11, wherein said pattern adhesive comprises a plurality of discontinuous segments of adhesive.

13. A label stack according to claim 11, wherein said stripes of release coat each have a release coat periphery, and said pattern adhesive overlies said pattern release coat within said release coat peripheries.

14. A label stack according to claim 11, wherein a select one of said plies includes indicia-thereon, said indicia comprising user variable indicia where said user variable indicia is hand written only and applied to said face in at least one release coat free area.

15. A label stack according to claim 11, wherein said preprinted indicia further comprises static press print indicia.

16. A label stack comprising:

a plurality of plies each having a face, a back, and first and second longitudinal edges;

a pattern release coat applied to said face of each ply, said pattern release coat defined by a first stripe of release coat adjacent to said first longitudinal edge, a second stripe of release coat adjacent to said second longitudinal edge and at least one inner stripe of release coat between said first and second stripes of release coat and spaced therefrom by release coat free areas wherein each face comprises preprinted indicia in at least a portion of the areas overlain by and visible through said pattern release coat; and, a pattern adhesive coat applied to each back, said pattern adhesive defined by a first stripe of adhesive adjacent and generally parallel to said first longitudinal edge, a second stripe of adhesive adjacent and generally parallel to said second longitudinal edge, and at least one inner stripe of adhesive that corresponds generally to said at least one inner stripe of release coat and spaced therefrom by adhesive free area wherein said plurality of piles are stacked such that said pattern release coat on a first one of said plurality of plies aligns generally with said pattern adhesive on a second one of said plurality of plies immediately thereabove; and;

wherein a select one of said plies includes indicia thereon, said indicia comprising user variable indicia where said user variable indicia is hand written only and applied to said face in at least one release coat free area.

17. A label stack according to claim 16, wherein said preprinted indicia further comprises static press print indicia.

18. A linerless label roll comprising:

a web of ply defining a plurality of individual labels;

said plurality of labels each having a label face, and a label back, and first and second web edges extending in the direction of said web;

a pattern release coat applied to each label face, said pattern release coat defined by a first stripe of release coat adjacent to said first web edge, a second stripe of release coat adjacent to said second web edge, and at least one inner stripe of release coat between and generally parallel to said first and second stripes of release coat and spaced therefrom by release coat free areas, wherein each label face comprises preprinted indicia in at least a portion of the areas overlain by and visible through said pattern release coat; and a pattern adhesive applied to each label back wherein said web of ply is formed into a roll such that said pattern adhesive overlies said at pattern release coat.

19. A label stack according to claim 18, wherein a select one of said individual labels includes indicia thereon, said indicia comprising user variable indicia where said user variable indicia is hand written only and applied to said face in at least one release coat free area.

20. A label stack according to claim 18, wherein said preprinted indicia further comprises static press print indicia.

* * * * *

UNITED STATES PATENT AND TRADEMARK OFFICE

CERTIFICATE OF CORRECTION

PATENT NO. : 6,830,795 B1

DATED : December 14, 2004

INVENTOR(S) : George Downs

It is certified that error appears in the above-identified patent and that said Letters Patent is hereby corrected as shown below:

Column 2,
Line 32, ""first ha stripe" should read -- first stripe --

Column 6,
Line 9, "label 15E" should read -- label back --

Column 7,
Line 15, "plies: and," should read -- plies; and, --

Column 8,
Line 45, "indicia-thereon," should read -- indicia thereon, --

Signed and Sealed this

Twenty-fourth Day of May, 2005

JON W. DUDAS
*Director of the United States Patent and Trademark Office*